(12) United States Patent
Ahn et al.

(10) Patent No.: US 10,525,439 B2
(45) Date of Patent: Jan. 7, 2020

(54) PROCESS FOR THE PRODUCTION OF THERMOPLASTIC MOULDING COMPOUNDS

(71) Applicant: INEOS STYROLUTION GROUP GMBH, Frankfurt (DE)

(72) Inventors: SangJun Ahn, Songpa-gu (KR); Wolfgang Fischer, Walldorf (DE); Norbert Niessner, Friedelsheim (DE); Brian J. Banaszak, Mannheim (DE); Roland Walker, Osnabrueck (DE); Ula El-Jaby, Ludwigshafen (DE); Achim Stammer, Freinsheim (DE); Klaus-Dieter Hungenberg, Birkenau (DE); Bernd Hisgen, Neuhofen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 164 days.

(21) Appl. No.: 15/564,586

(22) PCT Filed: Apr. 11, 2016

(86) PCT No.: PCT/EP2016/057902
§ 371 (c)(1),
(2) Date: Oct. 5, 2017

(87) PCT Pub. No.: WO2016/162557
PCT Pub. Date: Oct. 13, 2016

(65) Prior Publication Data
US 2018/0085732 A1   Mar. 29, 2018

(30) Foreign Application Priority Data
Apr. 10, 2015 (EP) .................................... 15163180

(51) Int. Cl.
*B01J 19/18* (2006.01)
*B01J 8/10* (2006.01)
(Continued)

(52) U.S. Cl.
CPC ............. *B01J 19/1837* (2013.01); *B01J 8/10* (2013.01); *B01J 8/20* (2013.01); *B01J 19/1881* (2013.01);
(Continued)

(58) Field of Classification Search
USPC ............................................. 525/53, 87, 942
See application file for complete search history.

(56) References Cited

U.S. PATENT DOCUMENTS 3,851,014 A    11/1974  Dalton
4,640,959 A *   2/1987  Alle ...................... C08F 279/04
                                               525/243
(Continued)

FOREIGN PATENT DOCUMENTS

DE    2846757 A1    5/1980
EP    0471550 A2    2/1992
(Continued)

OTHER PUBLICATIONS

International Preliminary Report on Patentability in International Application No. PCT/EP2016/057902, dated Jul. 14, 2017.

*Primary Examiner* — Fred M Teskin
(74) *Attorney, Agent, or Firm* — J.A. Lindeman & Co. PLLC; Jeffrey Lindman; Aaron Raphael

(57) ABSTRACT

The invention relates to a process for the production of thermoplastic moulding compounds, in particular ABS, wherein at least a first reagent (11) and a second reagent (12) of the thermoplastic moulding compounds are fed to a gear pump (10) which comprises a housing and at least a first gear wheel that is rotatable relative to the housing about a first
(Continued)

axis, and a second gear wheel that is rotatable relative to the housing about a second axis, wherein a loop conduit (29) is provided, and wherein the reagents (11, 12) are pressed in a loop through the loop conduit (29) and passing the gear wheels, whereby the reagents (11, 12) are dispersed to form a dispersion (15) in the gear pump (10). The invention also relates to a thermoplastic moulding compound that is produced by the inventive process.

12 Claims, 3 Drawing Sheets

(51) Int. Cl.
  *B01J 8/20* (2006.01)
  *B29B 7/44* (2006.01)
  *B29B 7/40* (2006.01)
  *C08L 55/02* (2006.01)
  *B29B 7/74* (2006.01)

(52) U.S. Cl.
  CPC .......... *B29B 7/7461* (2013.01); *B29B 7/7485* (2013.01); *C08L 55/02* (2013.01)

(56) References Cited

U.S. PATENT DOCUMENTS

| | | | |
|---|---|---|---|
| 4,952,627 A * | 8/1990 | Morita | B01J 19/242 |
| | | | 525/52 |
| 5,851,463 A | 12/1998 | Guntherberg et al. | |
| 5,883,189 A | 3/1999 | Eichenauer et al. | |
| 5,958,316 A | 9/1999 | Guntherberg et al. | |
| 6,165,399 A | 12/2000 | Guntherberg et al. | |
| 7,312,277 B2 * | 12/2007 | Maes | C08F 279/02 |
| | | | 428/36.8 |
| 2002/0111435 A1 | 8/2002 | Gasche et al. | |
| 2006/0034962 A1 | 2/2006 | Guntherberg et al. | |
| 2018/0178411 A1 * | 6/2018 | Ahn | B01J 8/10 |

FOREIGN PATENT DOCUMENTS

| | | |
|---|---|---|
| EP | 0735077 A1 | 10/1996 |
| EP | 2308902 A1 | 4/2011 |
| JP | S57167303 A | 10/1982 |
| JP | S60222223 A | 11/1985 |
| JP | H02286208 A | 11/1990 |
| JP | 2011132426 A | 7/2011 |
| WO | 1998/13412 A1 | 4/1998 |
| WO | 2004/028781 A1 | 4/2004 |
| WO | 2009/103714 A2 | 8/2009 |
| WO | 2015/000873 A1 | 1/2015 |

* cited by examiner

PROCESS FOR THE PRODUCTION OF THERMOPLASTIC MOULDING COMPOUNDS

BACKGROUND OF THE INVENTION

The invention relates to a process for the production of thermoplastic moulding compounds (compositions), in particular for the production of acrylonitrile-butadiene-styrene (ABS), wherein at least a first reagent (component) and a second reagent (component) of the thermoplastic moulding compound are fed to a gear pump. The invention also relates to a thermoplastic moulding compound that is produced by the inventive process.

It is known from the prior art to produce thermoplastic polymers, such as acrylonitrile-butadiene-styrene (ABS) by means of an extruder, in particular by means of a twin-screw extruder. In this case, the reagents, in particular styrene-acrylonitrile copolymer (SAN) and a polybutadiene based rubber, are fed to an extruder. The rubber can be present in the form of SAN-grafted rubber, respectively of SAN-grafted elastomer. Within the extruder, the reagents are melted and mixed, and/or dispersed, to form a dispersion and to form a moulding compound or a polymer blend. In this case, the rubber feed, in particular in the form of SAN-grafted rubber or SAN-grafted elastomer, is dispersed in a styrene-acrylonitrile matrix. Also other means for producing thermoplastic polymers are known, for example single screw extruders, kneading machines or banbury sheet compounding units.

WO 2009/103714 discloses a twin-screw extruder for extruding moulding compounds. The twin-screw extruder comprises in this case two screws which are accommodated in a barrel and which rotate in the same direction. The twin-screw extruder further comprises a feed zone, a transition zone and an output zone. The reagents are fed as moulding compound to the feed zone, which for this purpose has a charging opening.

The moulding compound can be fed in this case in solid form, in particular as granules, but also molten, and therefore viscous, to the feed zone. The moulding compound is t aken into the feed zone by means of the two screws, transported further and compressed. In the transition zone which follows the feed zone, the moulding compound is melted and homogenized. In the output zone, further homogenization of the moulding compound which is present as melt proceeds. Optionally, further residues present of solid particles are also fused. In addition, the material components are uniformly distributed. Also, the temperature of the melt is made uniform. In addition, in the output zone, a pressure necessary for extrusion through an extrusion die is built up.

WO 1998/13412 describes screw machines which have at least one pinch-off section having at least one baffle element and an associated dewatering opening upstream of the first baffle element. In addition, the screw machines contain degassing sections which are situated downstream of the last plasticizing section. The degassing openings and dewatering openings can be provided with a device which prevents escape of extrusion material. Retention screws are described as preferred for this purpose.

The degassing and dewatering of thermoplastic moulding compounds by means of screw machines is also known. EP-A 0735077 describes a process for the production of impact-modified thermoplastics by mechanical dewatering of an elastomeric component and mixing with a thermoplastic polymer in a screw machine. The dewatering openings are provided with retention screws and are operated at overpressure.

JP S02-286208 (1990) discloses three different dewatering processes by means of an extruder which is equipped with two screws. Moisture in liquid form and additionally in gaseous form is withdrawn from the extrusion mix in each case via Seiher barrels.

Document JP H57-167303 (1982) describes that an extrusion mix, in this case, e.g., slurries of polymer particles, is metered into a twin-screw extruder, dewatered, degassed and kneaded. Upstream of the compression zone, water can escape from the extruder in liquid form. Residual moisture can escape in gaseous form. Seiher barrels are used as dewatering openings.

JP H60-222223 (1985) discloses a process in which water in liquid form is withdrawn from an extrusion material, preferably a food, but also other materials. The dewatering proceeds by means of a twin-screw extruder. The moisture is discharged backwards through an opening which is attached to a vacuum pump.

A device for the extrusion of thermoplastics, in particular a screw machine, proceeds from WO 2004/028781. The device in this case comprises a degassing opening and a dewatering opening which is equipped, for example, with a metal wire cloth.

JP 2011 132 426 A discloses a method for producing rubber-reinforced thermoplastic resin composition. Thereby, reagents are supplied to a loop type reactor containing a pump and an external loop structure.

WO 2015/000873 discloses a process for the manufacturing of ABS-molding compositions. Thereby, a elastomer component, a thermoplastic polymer, a further polymer and additives are mixed in an extruder, comprising the steps of precipitating the elastomer component and mechanical dewatering of the elastomer component which leads to improved salt-free products.

In DE 28 46 757, a method for sintering of styrene-acrylonitrile graft polymers from dispersions is disclosed. The process is carried out in a tubular reactor, in particular in an extruder. In U.S. Pat. No. 3,851,014, a method for making rubber modified resins using a static mixer is disclosed.

DESCRIPTION OF THE INVENTION

One object of the invention is to provide a simplified and cheaper process for the production of thermoplastic moulding compounds (compositions). These moulding compounds are frequently polymer blends.

This object is achieved according to the invention by a process for the production of thermoplastic moulding compounds, in particular for the production of acrylonitrile-butadiene-styrene (ABS), wherein at least a first reagent and a second reagent of the thermoplastic moulding compounds are fed to a gear pump which comprises a housing and at least a first gear wheel that is rotatable relative to the housing about a first axis, and a second gear wheel that is rotatable relative to the housing about a second axis, wherein a loop conduit is provided, and wherein the reagents are pressed in a loop through the loop conduit and passing the gear wheels, whereby the reagents are dispersed to form a dispersion in the gear pump.

The produced thermoplastic moulding compounds (compositions) comprise or consist of a polymer blend. The blend contains one or more polymers which are dispersed as nm to micron size particles (e.g. rubber polymer particles with an average particle size in the range of nm to micrometers) within a polymer matrix (e.g. a SAN-copolymer matrix) which contains one or more other polymers. The at least two polymer reagents are the polymer matrix and the polymer(s) to be dispersed in the polymer matrix.

In particular, the process according to the invention is suitable for the production of acrylonitrile-butadiene-styrene (ABS). The first reagent for the production of acryloni-trite-butadiene-styrene (ABS) in this case contains or consists of styrene-acrylonitrile copolymers (SAN).

The first reagent styrene-acrylonitrile copolymer (SAN) is fed to the gear pump preferably in the molten state, and thus in the viscous state. The styrene-acrylonitrile copolymer (SAN) can be solved in a solution with one or several solvents, preferably 30%-99%, or can be heated above melting temperature (range).

In this case, the second reagent contains (or consists of) one or several rubber components, in particular in form of SAN grafted elastomer, with the elastomer preferably being a poly-butadiene based rubber. Hence, the second reagent can be a SAN grafted rubber, e.g. ABS. The SAN grafted elastomer is a wet or dry powder with a powder (average) particle size in the range of 1 to 1000 microns, with each powder particle being coagulated SAN grafted particles. The SAN grafted elastomer powder has a moisture content in the range of 0.5% to 40%.

The second reagent rubber, which is a SAN grafted elastomer, and which is a synthetic polymer, is likewise fed to the gear pump preferably as relatively fine powder, in particular having an average particle size of 10 to 1000, often 50 to 800 micrometer.

Alternatively, the second reagent rubber, which is a SAN grafted elastomer, is likewise fed to the gear pump in liquid state, in particular as solution with 1%-60% moisture content.

In the gear pump, the rubber, in particular the SAN grafted elastomer powder, is then dispersed in a styrene-acrylonitrile (SAN) matrix. As a result of which step the dispersion is formed.

One or more solvents can be added to the reagents. The solvent can be, for example, EB (ethylbenzene), AN (acrylonitrile), SM (styrene monomer) or mixtures thereof. However, other solvents are in principle also useable.

According to one embodiment of the process, the reagents and the at least one solvent are first mixed to form a pre-mix, and the pre-mix is fed to the gear pump, and the matrix polymer is melted. The pre-mix is viscous and preferably has a moisture content of 0% to 30%, often 1% to 30%. The premixing preferably takes place in a mixing vessel in which a beater rotates. Owing to the rotation of the beater, the premixing of the reagents to form the premix then proceeds.

The premix can be fed directly to the gear pump after premixing has been performed. In this case, the viscous premix is passed through a pipe or flexible tubing directly from the mixing vessel to the gear pump and is dispersed there. The premix can also be stored temporarily after premixing has been performed and later fed to the gear pump. In particular, the premix can be produced at a different location and then transported to the gear pump.

Preferably, the cross sectional area of the loop conduit is changeable, in particular by means of a loop valve that is arranged at the loop conduit.

The dispersion thus resulting can then be processed further to form the moulding compounds, in particular to form acrylonitrile-butadiene-styrene compositions (ABS). The further processing comprises, for example, a removal of solvent remaining in the resulting dispersion, and also a dewatering step(s). In addition, additives can be added and pelletizing can be carried out.

Preferably, the reagents are pressed in loops through the loop conduit from 10 times to 1000 times, often 20 to 100 times. Further embodiments of the invention will be described in more detail with reference to the drawings, the description hereinafter, and the claims.

Thermoplastic moulding compounds, in particular acrylonitrile-butadiene-styrene (ABS), can be produced advantageously by the inventive process. The invention is further illustrated by the Figures and the claims.

BRIEF DESCRIPTION OF THE DRAWINGS

In the drawings:

In FIG. 1, a schematic drawing of a first embodiment of a system for the production of moulding compounds, in particular for the production of acrylonitrile-butadiene-styrene (ABS), is shown schematically. The system comprises a gear pump 10 that has an inlet 42 to which reagents 11, 12 can be fed.

Figure 1:
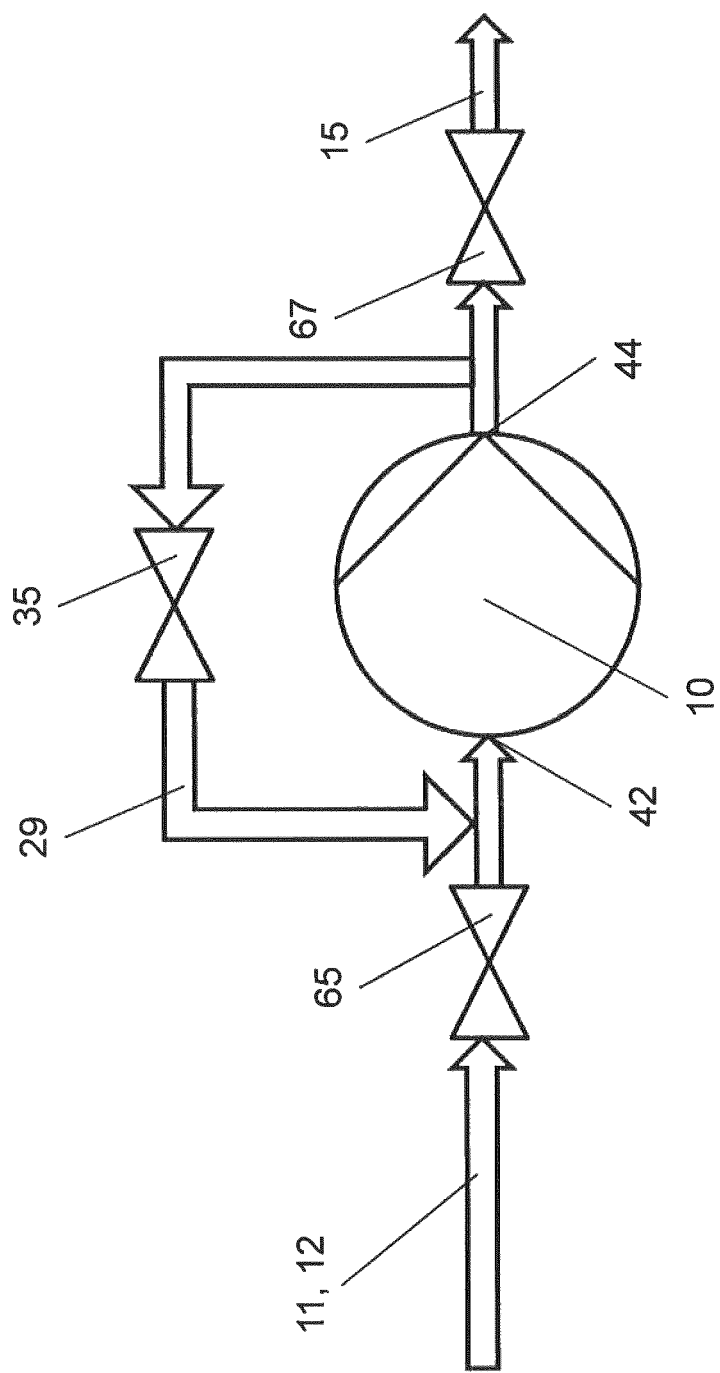
FIG. 1 shows a schematic drawing of a first embodiment of a system for the production of moulding compounds, in particular ABS-compositions.

For the production of acrylonitrile-butadiene-styrene (ABS), in particular a first reagent 11 and a second reagent 12 are fed to the inlet 42 of the gear pump 10, wherein in particular the first reagent 11 is styrene-acrylonitrile-copolymer (SAN), and the second reagent 12 is rubber, e.g. polybutadiene-rubber.

The second reagent 12 rubber is specifically a SAN grafted elastomer, with the elastomer preferably being a polybutadiene based rubber. Hence, the second reagent can be a SAN grafted rubber.

Within the gear pump 10, the first reagent 11 and the second reagent 12 that are fed to the inlet 42 are dispersed to form a dispersion 15. The resultant dispersion 15 is then further processable to form moulding compounds, in particular to form acrylonitrile-butadiene-styrene (ABS).

The gear pump 10 comprises a first gear wheel rotatable about a first axis and a second gear wheel rotatable about a second axis. The gear wheels have teeth that are in contact with each other, so that when one of the gear wheels rotates, the other gear wheel rotates, too. When rotating, the gear wheels rotate in opposite directions. The axes about that the gear wheels rotate are running parallel to one another. An electric motor is provided to drive one of the gear wheels.

The gear pump 10 comprises a housing in which the gear wheels are arranged. At a first front end of the housing, there is an opening which forms the inlet 42 of the gear pump 10. An outlet 44 is formed by an opening at a second front end of the housing of the gear pump 10.

The system further comprises a loop conduit 29. The loop conduit 29 connects the outlet 44 to the inlet 42. The loop conduit 29 can be arranged within the housing of the gear pump 10 or outside the housing of the gear pump 10.

A loop valve 35 is arranged at the loop conduit 29. With the loop valve 35, the cross sectional area of the loop conduit 29 is changeable. With the loop valve 35, the loop conduit 29 also can be closed completely.

Upstream of the inlet 42 of the gear pump 10, an incoming valve 65 is provided. When the incoming valve 65 is open, the reagents 11, 12 can be fed through the incoming valve 65 to the inlet 42 of the gear pump 10. Downstream of the outlet 44 of the gear pump 10, an outgoing valve 67 is provided.

When the outgoing valve 67 is open, the resultant dispersion 15 can be fed through the outlet 44 of the gear pump 10 and the outgoing valve 67.

Within a process for the production of moulding compounds, in particular for the production of acrylonitrile-butadiene-styrene (ABS), the first reagent 11 and the second reagent 12 are fed to the inlet 42 of the gear pump 10. The gear wheels forward the reagents 11, 12 from the inlet 42 to the outlet 44.

While the outgoing valve 67 is closed and the incoming valve 65 is closed and the loop valve 35 is open, the reagents 11, 12 are pressed from the outlet 44 into the loop conduit 29. From the loop conduit 29 the reagents 11, 12 are then pressed back to the inlet 42.

Within such a loop through the loop conduit 29 and passing the gear wheels, a partition of the reagents 11, 12 is dispersed to a dispersion 15. Within every new loop, some more of the reagents 11, 12 are dispersed to the dispersion 15. The resultant dispersion 15 also travels around within the loop conduit 29 and passing the gear wheels. Thereby, the resultant dispersion 15 is homogenized.

After a certain number of loops within the loop conduit 29, the reagents 11, 12 are dispersed, at least almost, completely. That means, only the dispersion 15 that is also homogenized, then travels around within the loop conduit 29, forwarded by the gear wheels.

Then, the outgoing valve 67 is opened and the loop valve 35 is closed, while the incoming valve 65 remains closed. The dispersion 15 is then pressed through the outlet 44 and through the outgoing valve 67.

When the dispersion 15 has left the outgoing valve 67, the outgoing valve 67 is closed and the loop valve 35 is opened again. Then, the incoming valve 65 is opened. While the incoming valve 65 is open, the first reagent 11 and the second reagent 12 are fed to the inlet 42 of the gear pump 10, again, and the gear wheels forward the reagents 11, 12 from the inlet 42 to the outlet 44. When a sufficient amount of reagents 11, 12 is present within the loop conduit 29, the incoming valve 65 is closed.

Within an alternative, continuous process for the production of moulding compounds, in particular for the production of acrylonitrile-butadiene-styrene (ABS), the incoming valve 65 and the outgoing valve 67 are open. The loop valve 35 is adjusted to a state in between of the closed state and the open state. The incoming valve 65, the outgoing valve 67 and the loop valve 35 remain in said positions during the production process. The first reagent 11 and the second reagent 12 are fed to the inlet 42 of the gear pump 10, and the gear wheels forward the reagents 11, 12 from the inlet 42 to the outlet 44.

Within said alternative, continuous process, a partition of the reagents 11, 12 is dispersed to a dispersion 15 when passing the gear wheels. A part of the reagents 11, 12 and the dispersion 15 are pressed from the outlet 44 into the loop conduit 29 and back to the inlet 42. Said part of the reagents 11, 12 and the dispersion 15 hence travel around within the loop conduit 29 in a loop, whereby the reagents 11, 12 are dispersed to the dispersion 15 and the resultant dispersion 15 is homogenized. A part of the resultant dispersion 15 is pressed towards the outlet 44. By means of the position of the loop valve 35 defining the cross sectional area of the loop conduit 29, the ratio of reagents 11, 12 and dispersion 15 pressed through the outlet 44 towards the outgoing valve 67 can be adjusted.

Subsequently, further processing, in particular dewatering, of the resultant dispersion 15 then takes place to give moulding compounds, in particular to provide acrylonitrile-butadiene-styrene copolymer compositions (ABS).

Figure 2:
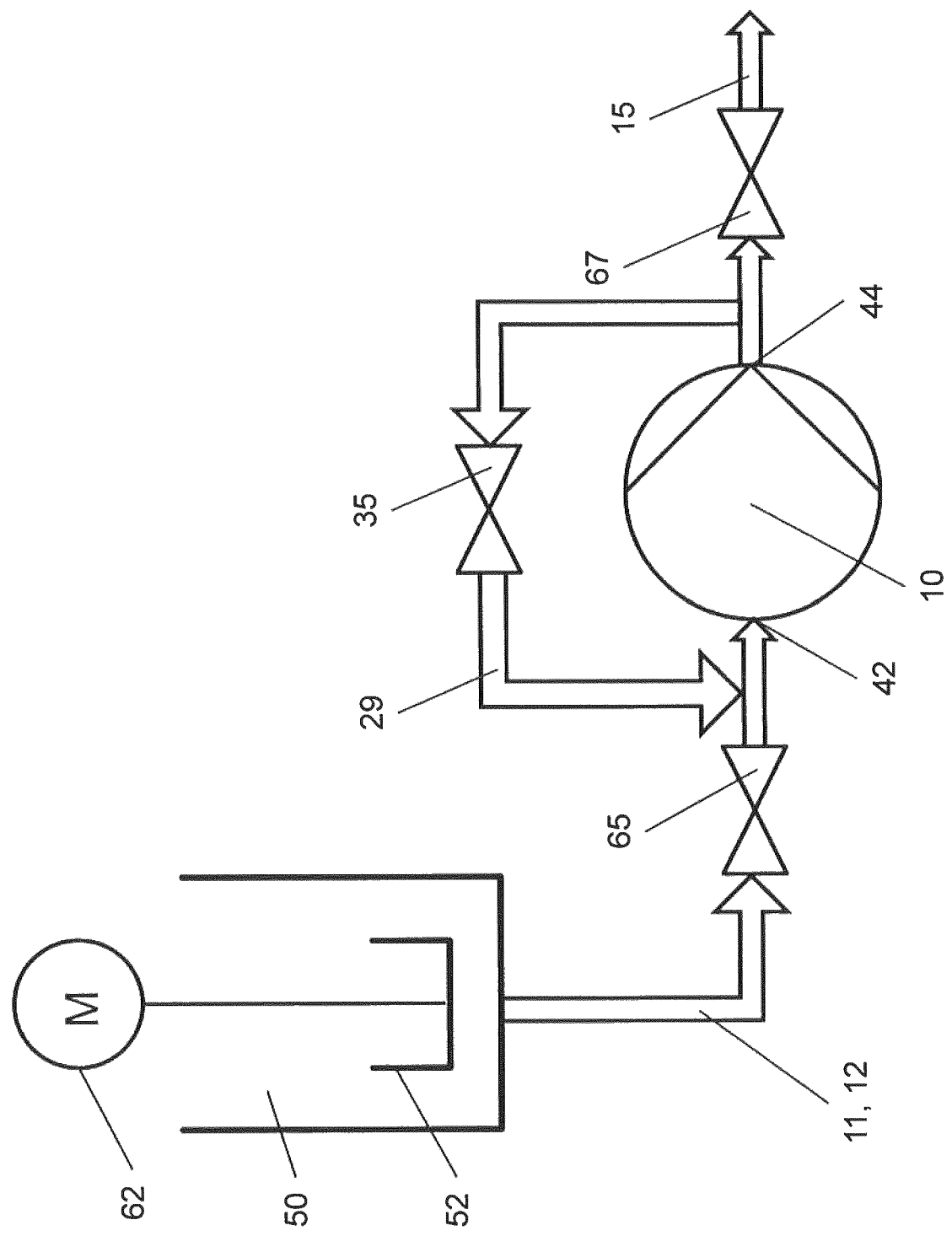
FIG. 2 shows a schematic drawing of a second embodiment of a system for the production of moulding compounds.

In FIG. 2 a schematic drawing of a second embodiment of a system for the production of moulding compounds, in particular for the production of acrylonitrile-butadiene-styrene (ABS), is shown.

The system further comprises a mixing vessel 50. The mixing vessel 50 has a beater 52 which is drivable by an electric motor 62. Downstream of the mixing vessel 50 and upstream of the inlet 42 of the gear pump 10 there is arranged the incoming valve 65. Downstream of the outlet 44 of the gear pump 10 there is arranged the outgoing valve 67. The system also comprises a loop conduit 29. The loop conduit 29 connects the outlet 44 to inlet 42.

Within a process for the production of moulding compounds, in particular for the production of acrylonitrile-butadiene-styrene (ABS), using the system according to FIG. 2, the first reagent 11 and the second reagent 12 are fed to the mixing vessel 50. Additionally, a solvent, for example EB (ethylbenzene), can be added to the reagents 11, 12. Within the mixing vessel 50, by a rotation of the beater 52, a premixing of the reagents 11, 12 proceeds to form a premix. The resultant premix is then fed through the incoming valve 65 to the inlet 42 of the gear pump 10.

Within the gear pump 10 and the loop conduit 29, the reagents 11, 12 are dispersed to the dispersion 15 within several loops, and thereby, the resultant dispersion 15 is homogenized, as described above. The resultant dispersion 15 is then delivered from outlet 44 of the gear pump 10 through the outgoing valve 67, as described above.

Subsequently, further processing, in particular dewatering, of the resultant dispersion 15 then takes place to give moulding compounds, in particular to give acrylonitrile-butadiene-styrene (ABS), as described above.

Figure 3:
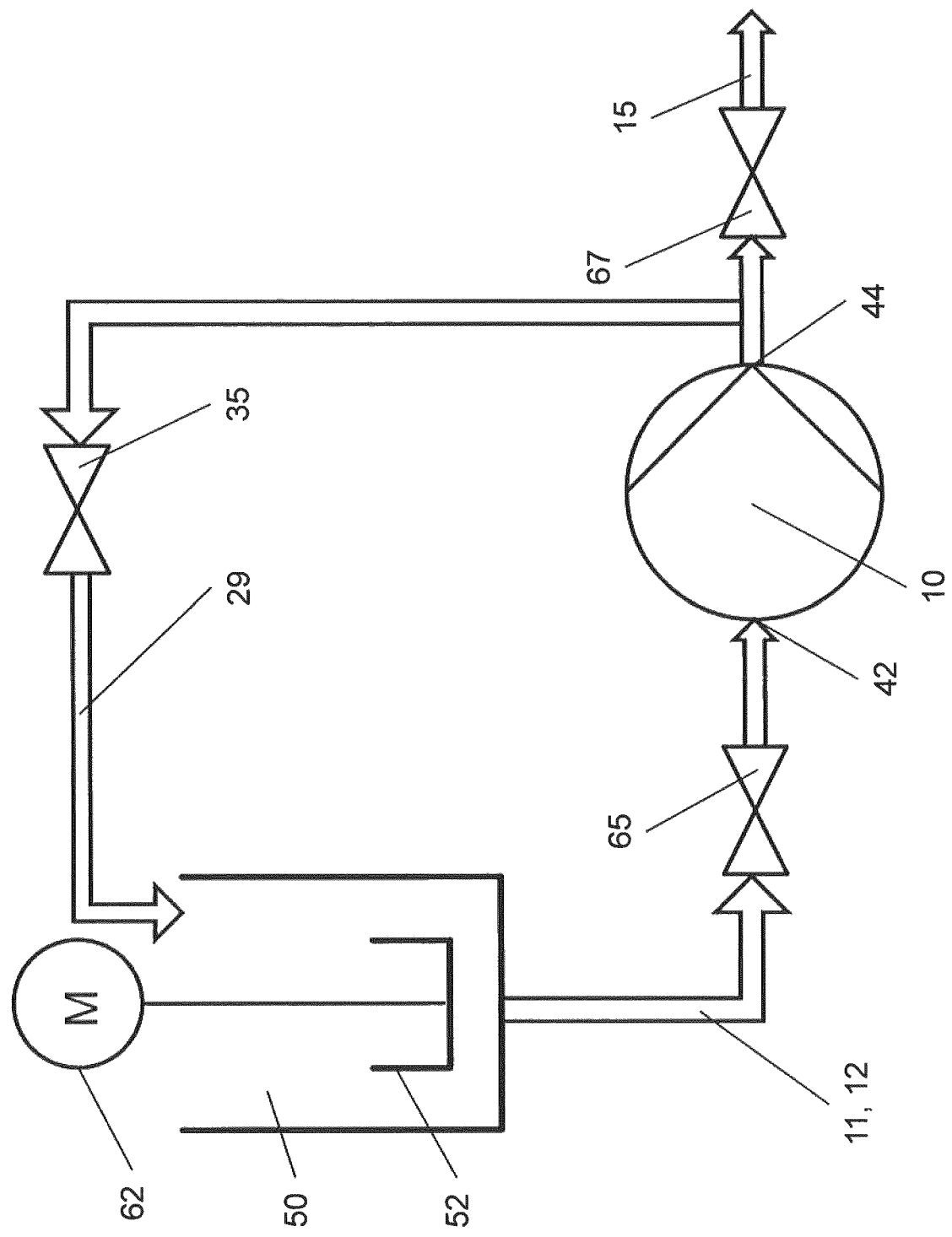
FIG. 3 shows a schematic drawing of a third embodiment of a system for the production of moulding compounds.

In FIG. 3 a schematic drawing of a third embodiment of a system for the production of moulding compounds, in particular for the production of acrylonitrile-butadiene-styrene (ABS), is shown.

The system comprises a mixing vessel 50, like the second embodiment. The mixing vessel 50 has a beater 52 which is drivable by an electric motor 62. Downstream of the mixing vessel 50 and upstream of the inlet 42 of the gear pump 10 there is arranged the incoming valve 65. Downstream of the outlet 44 of the gear pump 10 there is arranged the outgoing valve 67. The system also comprises a loop conduit 29. The loop conduit 29 connects the outlet 44 to mixing vessel 50.

Within a process for the production of moulding compounds, in particular for the production of acrylonitrile-butadiene-styrene (ABS), using the system according to FIG. 3, the first reagent 11 and the second reagent 12 are fed to the mixing vessel 50. Additionally, a solvent, for example EB (ethylbenzene), can be added to the reagents 11, 12. Within the mixing vessel 50, by a rotation of the beater 52, a premixing of the reagents 11, 12 proceeds to form a premix. The resultant premix is then fed through the incoming valve 65 to the inlet 42 of the gear pump 10.

Within the gear pump 10, the reagents 11, 12 are partially dispersed to the dispersion 15. The reagents 11, 12 and the dispersion 15 are fed through the loop conduit 29 back to the mixing vessel 50. Within several loops, the reagents 11, 12 are dispersed to the dispersion 15, and the resultant dispersion 15 is homogenized, as described above. The resultant dispersion 15 is then delivered from outlet 44 of the gear pump 10 through the outgoing valve 67, as described above.

Subsequently, further processing, in particular dewatering, of the resultant dispersion 15 then takes place to give moulding compounds, in particular to give ABS-compositions, as described above.

LIST OF REFERENCE SIGNS

10 gear pump
11 first reagent
12 second reagent
15 dispersion
29 loop conduit
35 loop valve
42 inlet
44 outlet
50 mixing vessel
52 beater
62 electric motor
65 incoming valve
67 outgoing valve

The invention claimed is:

1. A process for the production of acrylonitrile-butadiene-styrene (ABS), wherein:
at least a first reagent (11) that contains or consists of styrene-acrylonitrile copolymer (SAN) and
a second reagent (12) that contains or consists of polybutadiene based rubber in the form of SAN grafted elastomer
of the thermoplastic moulding compounds are fed to a gear pump (10) which comprises a housing and
at least a first gear wheel that is rotatable relative to the housing about a first axis, and a second gear wheel that is rotatable relative to the housing about a second axis, wherein a loop conduit (29) is provided, wherein
the cross sectional area of the loop conduit (29) is changeable by means of a loop valve (35) arranged at the loop conduit (29), and wherein
the reagents (11, 12) are pressed in a loop through the loop conduit (29) and
passing the gear wheels, whereby the reagents (11, 12) are dispersed to form a dispersion (15) in the gear pump (10).

2. The process according to claim 1, wherein the first reagent (11) styrene-acrylonitrile copolymer (SAN) is fed to the gear pump (10) in molten state.

3. The process according to claim 2, wherein the first reagent (11) styrene-acrylonitrile copolymer (SAN) is heated above melting temperature.

4. The process according to claim 1, wherein the second reagent (12) rubber is fed to the gear pump (10) as relatively fine powder having an average particle size of 10 to 1000 micrometer.

5. The process according to claim 1, wherein the second reagent (12) rubber is fed to the gear pump (10) in molten state.

6. The process according to claim 1, wherein at least one solvent is added to the reagents (11, 12).

7. The process according to claim 6, wherein the reagents (11, 12) and the at least one solvent are first mixed to form a pre-mix, and the pre-mix is fed to the gear pump (10).

8. The process according to claim 7, wherein the pre-mix is fed directly to the gear pump (10).

9. The process according to claim 7, wherein the pre-mix is stored temporarily and is later fed to the gear pump (10).

10. The process according to claim 1, wherein the dispersion (15) is processed further to form moulding compounds.

11. The process according to claim 1, wherein the reagents (11, 12) are pressed in loops through the loop conduit (29) from 10 times to 1000 times.

12. The process according to claim 1, wherein
the first reagent (11) and the second reagent (12) are fed to a mixing vessel (50), and wherein
within the mixing vessel (50) a premixing of the reagents (11, 12) proceeds to form a premix, and wherein
the resultant premix is then fed through an incoming valve (65) to an inlet (42) of the gear pump (10), and wherein
the reagents (11, 12) and the dispersion (15) are fed through the loop conduit (29) back to the mixing vessel (50), and wherein
the loop conduit (29) connects an outlet (44) of the gear pump (10) to the mixing vessel (50).

* * * * *